United States Patent
Wassenhoven

(10) Patent No.: US 9,051,970 B2
(45) Date of Patent: Jun. 9, 2015

(54) SUPPORT DISC BEARING FOR AN OPEN-END SPINNING DEVICE

(71) Applicant: Saurer Germany GmbH & Co. KG, Remscheid (DE)

(72) Inventor: Heinz-Georg Wassenhoven, Monchengladbach (DE)

(73) Assignee: Saurer Germany GmbH & Co. KG, Remscheid (DE)

( * ) Notice: Subject to any disclaimer, the term of this patent is extended or adjusted under 35 U.S.C. 154(b) by 36 days.

(21) Appl. No.: 13/934,574

(22) Filed: Jul. 3, 2013

(65) Prior Publication Data
US 2014/0029881 A1   Jan. 30, 2014

(30) Foreign Application Priority Data
Jul. 24, 2012   (DE) .................. 10 2012 014 660

(51) Int. Cl.
| F16C 33/30 | (2006.01) |
| F16C 33/58 | (2006.01) |
| D01H 4/12 | (2006.01) |
| F16C 19/04 | (2006.01) |
| F16C 35/063 | (2006.01) |
| F16C 35/06 | (2006.01) |
| F16C 35/067 | (2006.01) |

(52) U.S. Cl.
CPC .............. F16C 33/30 (2013.01); F16C 19/04 (2013.01); F16C 35/063 (2013.01); F16C 35/061 (2013.01); F16C 35/067 (2013.01); F16C 33/581 (2013.01); F16C 2340/18 (2013.01); D01H 4/12 (2013.01)

(58) Field of Classification Search
CPC ............. D01H 4/12; D01H 4/08; D01H 4/10; D01H 4/14; D01H 4/20; F16C 19/04; F16C 19/06; F16C 19/08; F16C 19/18; F16C 19/181; F16C 2340/18; F16C 35/04; F16C 35/06; F16C 35/061; F16C 35/067; F16C 35/063
USPC ............ 384/549; 57/104, 400, 401, 404, 406, 57/407, 78, 92, 103
See application file for complete search history.

(56) References Cited

U.S. PATENT DOCUMENTS

| 3,884,024 | A | * | 5/1975 | Oestreich et al. ............... 57/294 |
| 4,295,686 | A | * | 10/1981 | Black ....................... 301/64.302 |
| 4,371,218 | A | * | 2/1983 | Ichikawa ..................... 310/90.5 |
| 4,472,004 | A | * | 9/1984 | Fingerle et al. ............... 384/463 |

(Continued)

FOREIGN PATENT DOCUMENTS

| DE | 43 34 985 A1 | 4/1995 |
| DE | 44 26 202 A1 | 1/1996 |

(Continued)

*Primary Examiner* — Alan B Waits
(74) *Attorney, Agent, or Firm* — Nelson Mullins Riley & Scarborough LLP

(57) ABSTRACT

A rotor bearing comprising at least one support disc pair, which is comprised of two support discs (40, 41, 42, 43), which are arranged in such a way that they form a wedge gap, and a spinning rotor (3) with a rotor shaft (4), which is mounted in the wedge gap. The invention is to provide a support disc bearing that is easy to produce. For this purpose, a rolling bearing (45) is arranged in the base body (44) of the support discs (40, 41, 42, 43) and the rolling bearings (45) are in each case applied on a fixed bearing bolt (50, 51, 52, 53). The invention furthermore relates to the support disc (40, 41, 42, 43) and a method for producing the support disc (40, 41, 42, 43).

14 Claims, 3 Drawing Sheets

(56) References Cited

U.S. PATENT DOCUMENTS

| | | | |
|---|---|---|---|
| 4,516,396 A * | 5/1985 | Stahlecker et al. | 57/407 |
| 4,541,740 A * | 9/1985 | Schard | 384/473 |
| 4,676,673 A * | 6/1987 | Stahlecker et al. | 384/549 |
| 4,713,932 A * | 12/1987 | Zott | 57/406 |
| 4,896,976 A * | 1/1990 | Stahlecker | 384/549 |
| 4,916,891 A * | 4/1990 | Landwehrkamp et al. | 57/406 |
| 5,517,814 A * | 5/1996 | Stahlecker | 57/406 |
| 5,551,226 A * | 9/1996 | Keir et al. | 57/406 |
| 5,728,343 A | 3/1998 | Ueno | |
| 6,016,649 A * | 1/2000 | Bock et al. | 57/406 |
| 6,033,121 A * | 3/2000 | Stahlecker | 384/549 |
| 6,092,357 A * | 7/2000 | Wassenhoven et al. | 57/406 |
| 6,116,012 A * | 9/2000 | Braun | 57/406 |
| 6,220,761 B1 * | 4/2001 | Bock et al. | 384/549 |
| 6,739,117 B2 * | 5/2004 | Fietz | 57/404 |
| 7,200,983 B2 * | 4/2007 | Zott | 57/264 |
| 7,736,065 B2 * | 6/2010 | Fietz | 384/549 |
| 8,072,105 B2 * | 12/2011 | Winzen | 310/90.5 |
| 2002/0025094 A1 * | 2/2002 | Schuller et al. | 384/549 |
| 2002/0172443 A1 * | 11/2002 | Muraki et al. | 384/537 |
| 2003/0136100 A1 * | 7/2003 | Schuller et al. | 57/406 |
| 2006/0147141 A1 * | 7/2006 | Harwood et al. | 384/480 |
| 2007/0263951 A1 * | 11/2007 | Fietz | 384/549 |
| 2008/0212908 A1 * | 9/2008 | Mori et al. | 384/115 |
| 2009/0220181 A1 * | 9/2009 | Yamada et al. | 384/513 |
| 2010/0119183 A1 * | 5/2010 | Winzen | 384/438 |
| 2013/0219849 A1 * | 8/2013 | Heinen et al. | 57/92 |
| 2014/0154072 A1 * | 6/2014 | Quartarone et al. | 415/229 |

FOREIGN PATENT DOCUMENTS

| | | |
|---|---|---|
| DE | 44 42 782 A1 | 6/1996 |
| DE | 695 20 776 T2 | 5/2002 |
| DE | 102 00 743 A1 | 7/2003 |
| EP | 1 852 530 A1 | 11/2007 |

* cited by examiner

SUPPORT DISC BEARING FOR AN OPEN-END SPINNING DEVICE

CROSS-REFERENCE TO RELATED APPLICATIONS

This application claims priority from German Patent Application No. DE 10 2012 014 660.4, filed Jul. 24, 2012, herein incorporated fully by reference in its entirety.

FIELD OF THE INVENTION

The invention relates to a rotor bearing for an open-end spinning device, and more particularly, to such a rotor bearing comprising two support disc pairs, the support discs of which are arranged in such a way that they form a wedge gap, and a spinning rotor with a rotor shaft, which is mounted in the wedge gap. The invention furthermore relates to a support disc for a rotor bearing of this type and a method for producing a support disc with a base body made of plastics material.

BACKGROUND OF THE INVENTION

Various systems are used to mount spinning rotors in open-end spinning devices. The rotor shaft of the spinning rotor may be directly mounted. For this purpose, a so-called pivot bearing can be used. However, indirect bearings are also known, in which the rotor shaft is mounted in support discs, the support discs in turn being able to be mounted by means of a pivot bearing. A support disc bearing, in comparison to a direct bearing with pivot bearings, has a longer service life, as the support discs, at the same rotational rotor speed, are operated at a lower rotational speed because of the transmission ratio between the rotor shaft and the support discs. However, the construction of a support disc bearing in comparison to a direct bearing is relatively complex and therefore gives rise to high production costs.

German Patent Publication DE 44 26 202 A1 discloses a support disc bearing for an open-end spinning device with a spinning rotor. The rotor shaft of the spinning rotor is driven by a tangential belt and is mounted in the wedge gap of two support disc pairs. Each support disc pair forms its own wedge gap. The support disc pairs are spaced apart from one another in the axial direction of the rotor shaft, so two support points are available for the rotor shaft. A respective support disc of a support disc pair is mounted by means of a bearing arrangement, which comprises a rotatable bearing axle with positioning means, rolling bearings, a spring sleeve connected between the rolling bearings as well as a bearing housing, on a bracket arranged on the rear of the rotor housing. The support discs are in each case attached by means of a press fit on the ends of the rotatable bearing axle. The support discs have a base body made of aluminium and a resilient plastics material raceway on the periphery of the base body. The plastics material raceway is necessary for damping purposes.

German Patent Publication DE 102 00 743 A1 discloses a support disc made of aluminium with a running surface made of plastics material, for example polyurethane or rubber. The running coating of the support disc is applied to the base body by means of injection molding. The base body may be produced by turning from a solid material. Bores are introduced in an additional working step. This means a high manufacturing outlay. It is also known to produce the aluminium body by extrusion. The manufacturing outlay is reduced by this but the aluminium body cannot be produced with the required fitting precision, so the base body generally has to be reworked by machining.

European Patent Publication EP 1 852 530 A1 also discloses a support disc for a rotor bearing of an open-end spinning device. The possibility of the base body also being able to be produced from plastics material is described. However, it has been shown that the support disc with a base body made of plastics material cannot be reliably applied to a bearing axle or bearing pins, because the plastics material starts to flow when there are pressing forces. In other words, a plastic deformation of the plastics material takes place, which makes a reliable hold impossible. In order to improve the seat on the bearing pin, it is therefore proposed that after the production of the plastics material base body, a bush comprised of metal is inserted into its hub.

SUMMARY OF THE INVENTION

The present invention is based on the object of providing a rotor bearing with support discs for an open-end spinning device, which is easy, and therefore economical, to produce.

To achieve the object, the rotor bearing comprises support discs with a base body, in which the rolling bearing is arranged. The rotor bearing furthermore has fixed bearing bolts, on which the rolling bearings are attached.

According to the invention, the rolling bearing is no longer a part of a separate complex bearing arrangement, but directly embedded in the support discs. Owing to the fixed bearing bolts, the arrangement can be manufactured comparatively easily and with high precision. The arrangement according to the invention, in comparison to support discs on an axle mounted in a pivot bearing, has less individual parts, so the tolerance deviations can be reduced. In particular, the parallelism of the axles of the support discs is improved. This is important for an optimal support of the rotor shaft. A non-symmetrical support of the rotor shaft impairs the true running and can therefore lead to increased wear and impair the spinning result. The same also applies to unbalanced states, which influence the true running. For this reason, rotating parts of rotor bearings are frequently balanced. If a balancing is still necessary at all in the arrangement according to the invention because of the higher manufacturing precision, the balancing is easier, as less rotating parts are present. The support discs for a rotor bearing according to the invention may be balanced separately. The balancing does not have to be carried out in the installed state.

The rolling bearings are preferably connected to one of the fixed bearing bolts by a press fit. Thus, in conjunction with the bearing according to the invention, a simple and known connecting technique can be used.

The invention also relates to a support disc for the rotor bearing of the open-end spinning device, in the base body of which a rolling bearing is arranged.

The base body of the support disc may advantageously be made of plastics material. Plastics material has a low weight, is easy to form and economical.

The base body made of plastics material can be produced by means of injection molding. The support disc or its base body can easily be produced by the injection molding method.

However, it is also possible to produce a support disc according to the invention with a base body made of metal, in particular of aluminium.

In a base body made of plastics material, the rolling bearing can be embedded in the base body and fitted into the base body by means of the shrinkage occurring during the injection molding. The connection of the base body to the rolling bearing can thus be produced easily and in a dimensionally stable manner. The shrinkage during the injection molding provides a connection with a precise fit between the base body and rolling bearing. A problematic press connection between a metal and a plastics material element is not necessary.

According to a preferred embodiment of the support disc, the base body surrounds the outer periphery of the rolling bearing in the radial direction. The base body may, however, at least partially also surround the rolling bearing in the axial direction. If the two features are fulfilled, a positive connection both in the radial and in the axial direction is produced between the base body and the rolling bearing.

In a base body made of metal, the rolling bearing can be connected to the base body by means of a press fit or by flanging.

The rolling bearing can also be connected to the base body by gluing.

A running coating is preferably present on the outer periphery of the base body.

In a base body made of plastics material, the base body is comprised of a first plastics material, and the running coating of a second plastics material. By using different plastics materials, the respective requirements can easily be taken into account. The running coating preferably of a resilient plastics material, for example polyurethane. A material with a higher rigidity, for example a polyamide, should be selected for the base body. The polyamide can additionally be glass fiber-reinforced. Production can take place by means of a known two-component injection molding method.

The rolling bearing is preferably configured as a ball bearing. A ball bearing, more precisely a radial ball bearing, can absorb radial forces, but to a certain extent, also axial forces. The ball bearing is therefore particularly suitable. However, in principle, it is also possible to use a roller bearing.

The invention also relates to a method for producing a support disc according to the invention from plastics material, the rolling bearing, before the injection molding, being arranged in a tool being used to produce the base body and the rolling bearing being connected to the base body during the injection molding in such a way that it is rigidly seated in the base body.

BRIEF DESCRIPTION OF THE DRAWINGS

The invention will be described in more detail below with the aid of an embodiment shown in the drawings, in which.

DETAILED DESCRIPTION OF THE PREFERRED EMBODIMENTS

Figure 1:
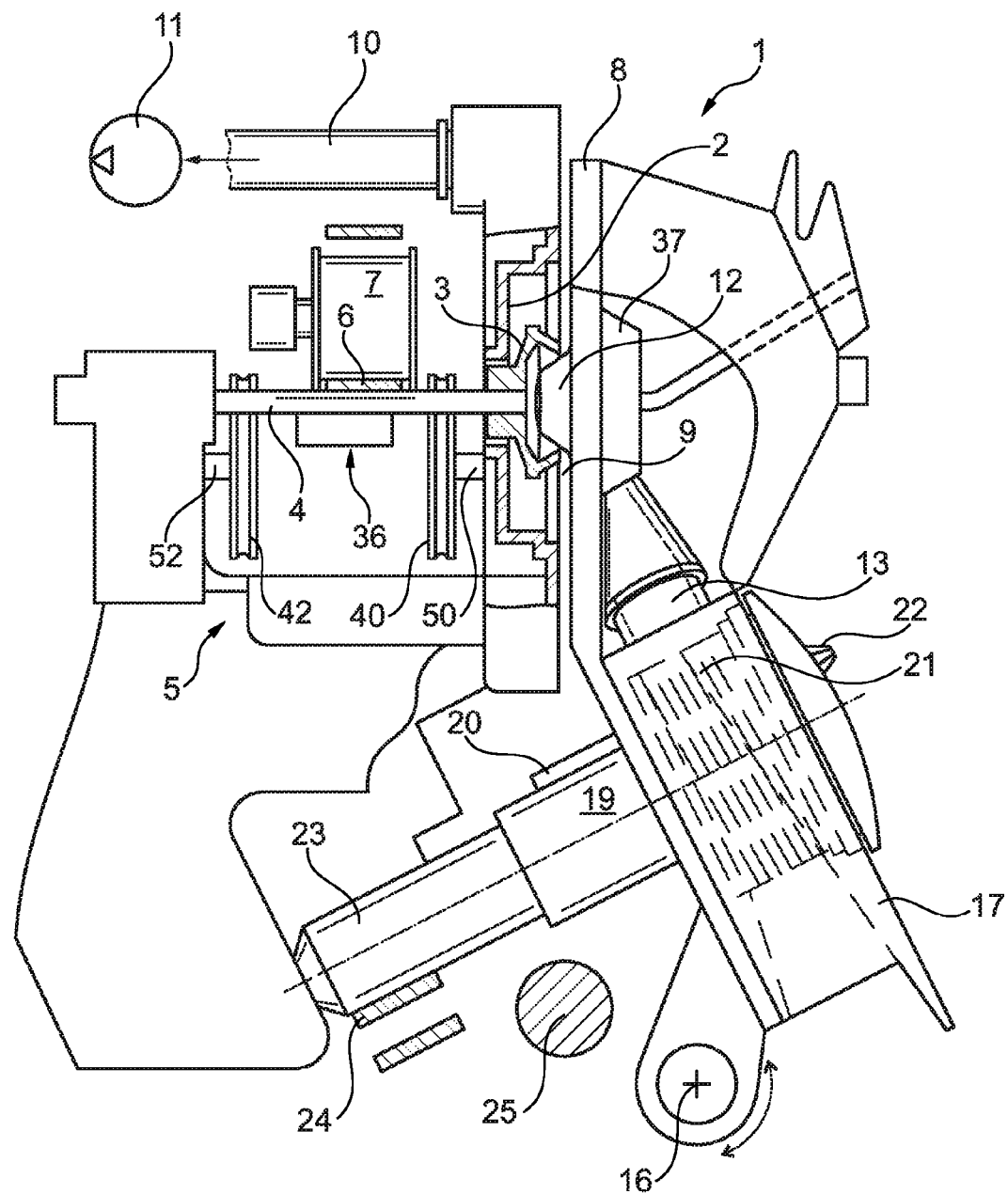
FIG. 1 shows a side view of an open-end spinning device according to the invention with a support disc bearing.

The open-end rotor spinning device 1 shown in FIG. 1 has a rotor housing 2, in which a spinning rotor 3 rotates at a high rotational speed. In the embodiment, the spinning rotor 3 is supported with its rotor shaft 4 in the wedge gap, also called an interstice, of a support disc bearing 5 and is driven by a tangential belt 6 along the length of the machine, which is driven by a pressure roller 7. A brake device 36, known per se, for the spinning rotor is arranged in the region of the rotor shaft 4.

The rotor housing 2, which is open per se to the front, is closed during spinning operation by a pivotably mounted cover element 8, in which a channel plate 37 with a receiver for an exchangeable channel plate adapter 12 and an annular groove for a seal 9 are integrated.

The rotor housing 2 is also connected by a corresponding pneumatic line 10 to a negative pressure source 11, which produces the necessary negative spinning pressure in the rotor housing 2 during the spinning operation. As described above, but not shown in more detail in the figures, arranged in a receiving opening of the channel plate 37 is an exchangeable channel plate adapter 12 which, as conventional, at the front, has a yarn draw-off nozzle and the mouth region of a fiber guide channel portion on the outlet side. This fiber guide channel portion on the outlet side, in the operating state, adjoins a fiber guide channel portion on the inlet side formed by the fiber guide channel 13.

The cover element 8, which is mounted so as to be rotatable to a limited extent about a pivot axle 16, has an opening roller housing 17 and has rear bearing brackets 19, 20 to mount an opening roller 21 or a fiber band feed cylinder 22. As indicated, the opening roller 21 in the embodiment is driven in the region of its wharve 23 by a peripheral tangential belt 24 along the length of the machine, while the fiber band feed cylinder 22 is preferably driven by a worm gear arrangement (not shown), which is connected to a drive shaft 25 along the length of the machine. In an alternative embodiment, single motor drives can obviously also be provided here for the opening roller 21 and/or the fiber band feed cylinder 22.

Figure 2:
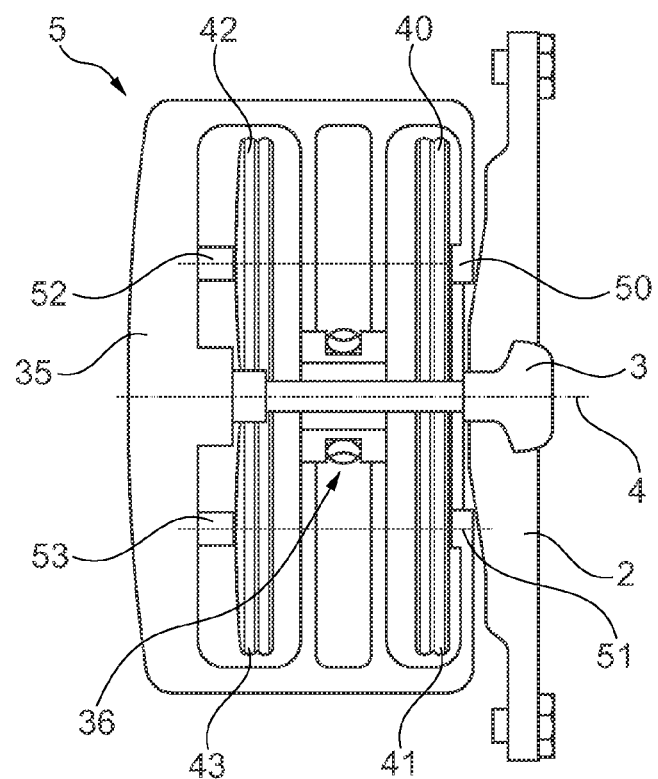
FIG. 2 shows a plan view of a support disc bearing according to the invention.
Figure 3:
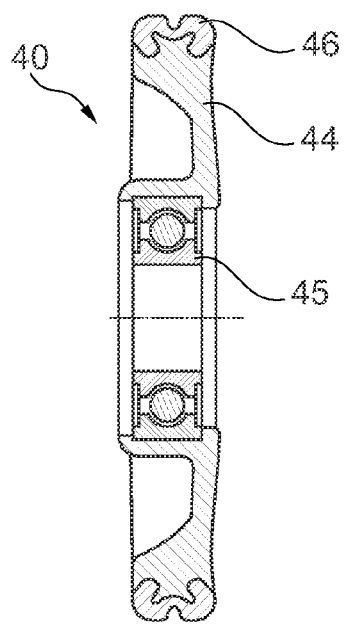
FIG. 3 shows a support disc according to the invention made of plastics material.

In FIG. 2, the support disc bearing 5 is shown more precisely. In the embodiment shown, the rotor shaft 4 is mounted in two support disc pairs. The first support disc pair is formed by the support discs 40 and 41 and the second is formed by the support discs 42 and 43. As can be seen in FIG. 3, a ball bearing 45 is embedded in the support discs. Four fixed bearing bolts 50, 51, 52, 53 are arranged on a support frame 35. The ball bearings 45 of the support discs 40, 41, 42, 43 are pressed onto these bearing bolts 50, 51, 52, 53.

The support disc 40 is shown more precisely in FIG. 3, the other support discs 41, 42, 43 being identically constructed. The support disc 40 has a base body 44, a running coating 46 and a ball bearing 45. The base body 44 is comprised of a glass fiber-reinforced polyamide, which has the necessary rigidity. The base body 44 is produced by an injection molding method. For this purpose, the plastics material is plasticised in an injection unit using an injection molding machine and injected into an injection molding tool. The cavity of the injection molding tool predetermines the shape of the support disc here. The ball bearing 45 is already arranged in the tool during the injection molding, so it is encapsulated by the plastics material. The ball bearing can be fixed in the tool, for example, on the internal radius of the ball bearing, which is not encapsulated by the plastics material. The ball bearing is embedded in the finished base body and fitted in by means of the shrinkage occurring during the injection molding. In the embodiment shown, the base body surrounds the outer periphery of the rolling bearing in the radial direction and the base body partially surrounds the rolling bearing in the axial direction.

In a second step of the injection molding method, a running coating 46 made of polyurethane is applied to the outer periphery of the base body 44. In order to achieve a rigid connection between the base body 44 and the running coating 46 and to avoid a release of the running coating at a high rotational operating speed of the support disc 40, the base body 44 has a profiling in a known manner on its outer periphery.

Figure 4:
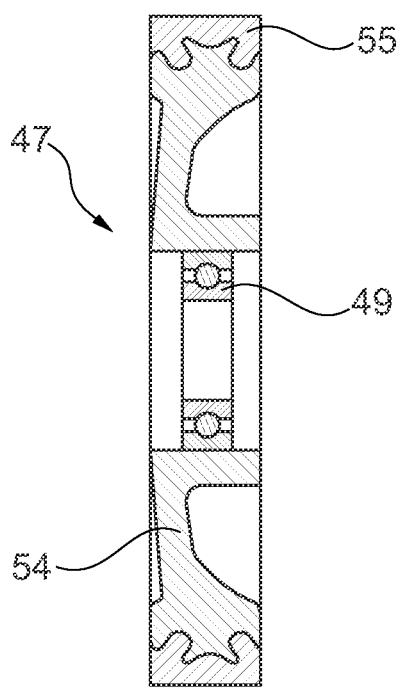
FIG. 4 shows a support disc according to the invention made of aluminium.
Figure 5:
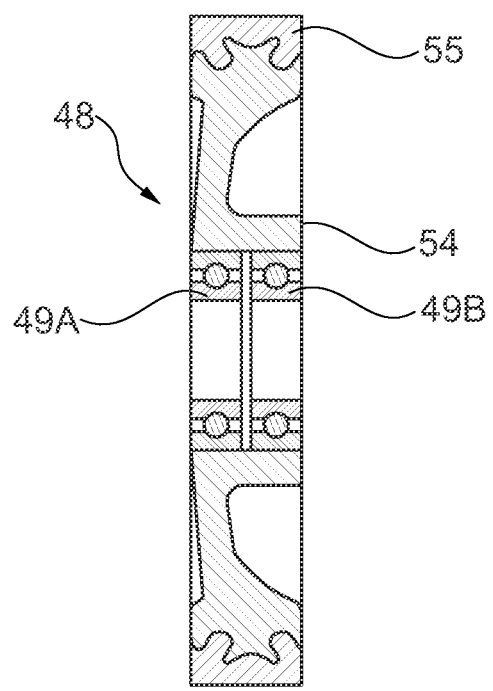
FIG. 5 shows a support disc according to the invention made of aluminium with two rolling bearings.

FIGS. 4 and 5 in each case show an alternative embodiment of a support disc 47 and 48 according to the invention. The support discs 47 and 48 may be arranged in a rotor bearing in accordance with FIGS. 1 and 2. The support discs 47 and 48 in each case have a base body 54 made of aluminium. However, other metals are also possible. A running coating 55 made of polyurethane is applied to the base body 54. Of course, it is also possible to use other resilient plastics materials as the running coating. A ball bearing 49 is pressed into the base body 54 of the support disc 47. The support disc 48 differs from the support disc 47 only in that two ball bearings 49A and 49B are pressed into the base body 54. When using two bearings, forces are distributed over the two bearings and the service life of the support disc is increased.

A support disc made of plastics material, in which two bearings are embedded, is possible as a further embodiment, not shown, of the present invention.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. An open-end spinning device (1), comprising a rotor housing, two pairs of support discs mounted to the rotor housing, the support discs (40, 41, 42, 43, 47, 48) being arranged in such a way that they form a wedge gap, and a spinning rotor (3) with a rotor shaft (4), the rotor shaft being mounted in the wedge gap, each of the support discs (40, 41, 42, 43, 47, 48) comprising an annular outer base body (44, 54), characterised in that a respective rolling bearing (45, 49, 49A, 49B) is arranged centrally within each of the base bodies (44, 54) for rotation of each base body about the respective rolling bearing, the rotor bearing having bearing bolts (50, 51, 52, 53) fixed stationarily and non-rotatively to the rotor housing and each of the rolling bearings (45, 49, 49A, 49B) being fixed on a respective bearing bolt (50, 51, 52, 53).

2. An open-end spinning device according to claim 1, characterised in that the rolling bearings (45, 49, 49A, 49B) are connected to the bearing bolts (50, 51, 52, 53) by a press fit.

3. An open-end spinning device according to claim 1, characterised in that a running coating (46, 55) is provided on the outer periphery of the base body (44, 54).

4. An open-end spinning device according to claim 3, characterised in that the base body (44) of the support disc (40, 41, 42, 43) is comprised of plastics material.

5. An open-end spinning device according to claim 4, characterised in that the base body (44) is produced by means of injection molding.

6. An open-end spinning device according to claim 5, characterised in that the rolling bearing (45) is embedded in the base body (44) and is fitted in by means of the shrinkage occurring during the injection molding.

7. An open-end spinning device according to claim 6, characterised in that the base body (44) surrounds the outer periphery of the rolling bearing (45) in the radial direction.

8. An open-end spinning device according to claim 4, characterised in that a the base body (44) comprised of a first plastics material and the running coating (46) comprised of a second plastics material.

9. An open-end spinning device according to claim 3, characterised in that the support disc (47, 48) comprises a base body (54) made of metal.

10. An open-end spinning device according to claim 9, characterised in that the support disc (47, 48) comprises a base body (44) made of aluminium.

11. An open-end spinning device according to claim 9, characterised in that the rolling bearing (49, 49A, 49B) is connected to the base body (54) by means of a press fit.

12. An open-end spinning device according to claim 9, characterised in that the rolling bearing (49, 49A, 49B) is connected to the base body (54) by flanging.

13. An open-end spinning device according to claim 3, characterised in that the rolling bearing (45, 49, 49A, 49B) is connected to the base body (44, 54) by gluing.

14. An open-end spinning device according to claim 3, characterised in that the rolling bearing is configured as a ball bearing (45, 49, 49A, 49B).

\* \* \* \* \*